United States Patent Office.

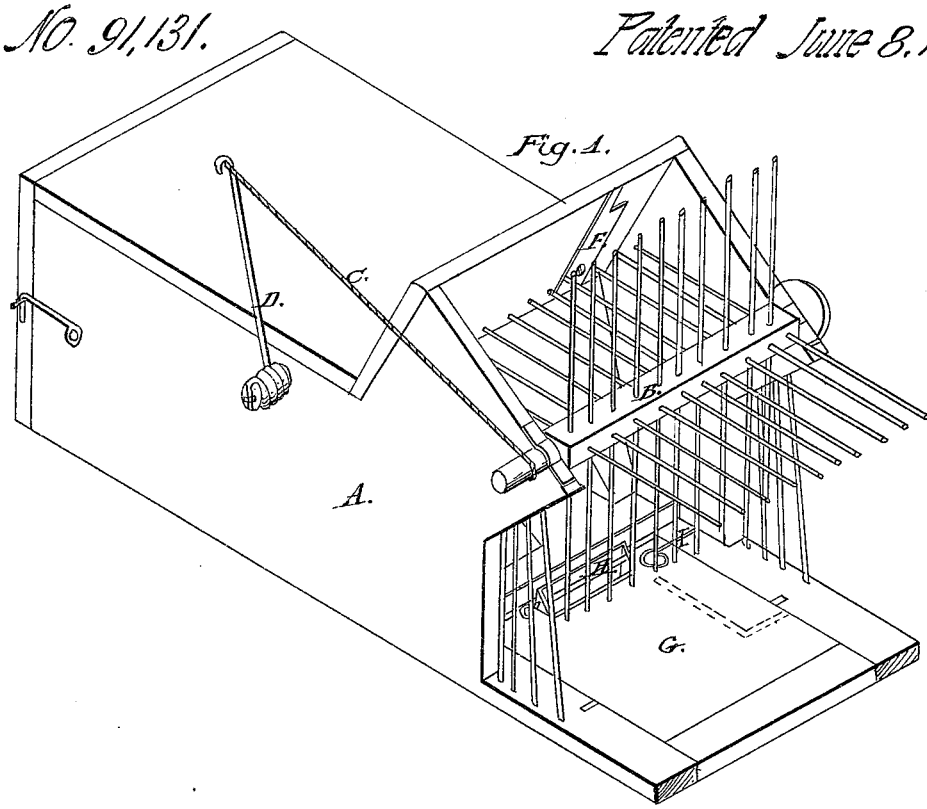
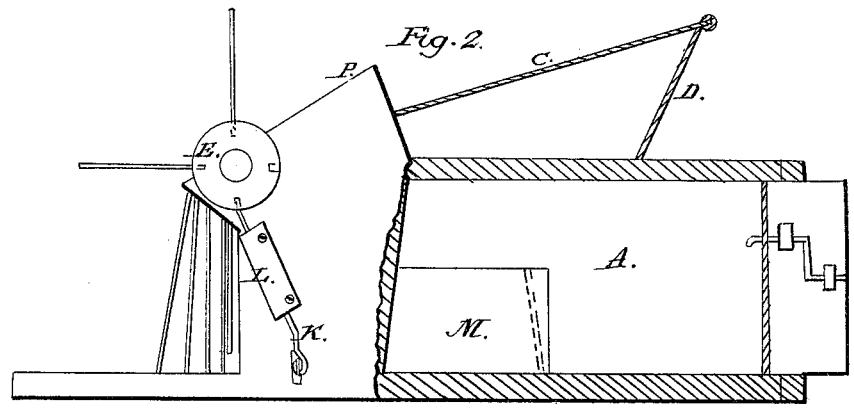

J. HERR, OF CARBONDALE, ILLINOIS.

Letters Patent No. 91,131, dated June 8, 1869.

IMPROVED ANIMAL-TRAP.

The Schedule referred to in these Letters Patent and making part of the same.

*To all whom it may concern:*

Be it known that I, J. HERR, of Carbondale, in the county of Jackson, and in the State of Illinois, have invented new and useful Improvements in Animal-Traps; and do hereby declare that the following is a full, clear, and exact description thereof, reference being had to the accompanying drawings, and to the letters of reference marked thereon.

The object of my invention is to provide a self-setting animal-trap, and consists in the arrangement and combination of devices hereafter set forth and described.

Figure 1 is a perspective of my trap.

Figure 2 is a side elevation of the same, part of the frame being torn away, so as to show the interior.

Letter A represents the frame of trap, which may be of any size or shape desired, and which has an elevated front upon the opening.

Hung just at the point of this elevation, is the revolving reel B, which is provided with four wings, one upon each side of the reel, the bearings of which extend out beyond the sides of the box at each end.

One of these ends is intended to be wrapped by the cord C, which is attached to the spring D. This spring is secured by its lower end, to a projection in the side of the box A, and as long as the cord is unwound, remains in an upright position, but when the trap is set, the spring is drawn down to a horizontal one.

Upon the opposite end of the reel is a ratchet-wheel, E, which has a ratchet for each side of the reel, and which checks the reel after each quarter revolution.

Extending through the reel, at right angles with one another, are two sets of wires, which extend to some distance outwards, and are used to sweep the animals into the traps as the reel revolves.

Attached to the side of the elevation on the end of the trap, is the spring F, upon which the wings catch as they fly around.

Upon the floor of the front end of the frame, is hung the trap-door G, which has a spring placed underneath, so as to keep it in its proper position.

On the inner end of the door, is placed a small box or trough, H, in which the bait for the animal is placed.

Secured to the top of this door is a small rod, I, which extends out through the side of the frame, and is fastened to the end of the trigger K.

In order to hold this trigger in its place, the guide L has been provided, which holds it against the edge of the ratchet E, so that it will catch in the holes or ratchets, at each quarter revolution.

At the rear end of the frame, there are placed a wire grating, and two doors, the larger of which closes the whole end, while the second is a small metal one, placed in the grating, through which the animals are taken out.

The operation of the trap is as follows:

The bait is placed in the trough H, the spring F held back by the hand, so as to allow the wings to pass, and the reel B turned until the cord C has been wound around its end. The trap is then ready for use.

As the animal advances towards the bait, its weight presses down the door G, which operates upon the rod I, and this, in turn, pulls the trigger K downwards.

This releases the ratchet E, when the spring D causes the reel to revolve, the wing of which sweeps the animal inwards, and being unable to escape from the front, it rushes into the funnel M, and passing easily through the inclined door, is caged.

Having thus described my invention,

What I do claim, and desire to secure by Letters Patent, is—

The combination of the box A, wire reel B, and pulley-cord C, spring D, pivoted bottom G, trough H, spring-rod I, trigger K, guide L, and ratchet E, all constructed and operated as herein set forth.

In testimony that I claim the foregoing, I have hereunto set my hand, this 24th day of March, 1869.

J. HERR.

Witnesses:
R. M. RHEA,
LEOPOLD EVERT.